Jan. 2, 1951  H. A. DUKE  2,536,921
VALVE ASSEMBLY
Filed Aug. 27, 1948  2 Sheets-Sheet 1
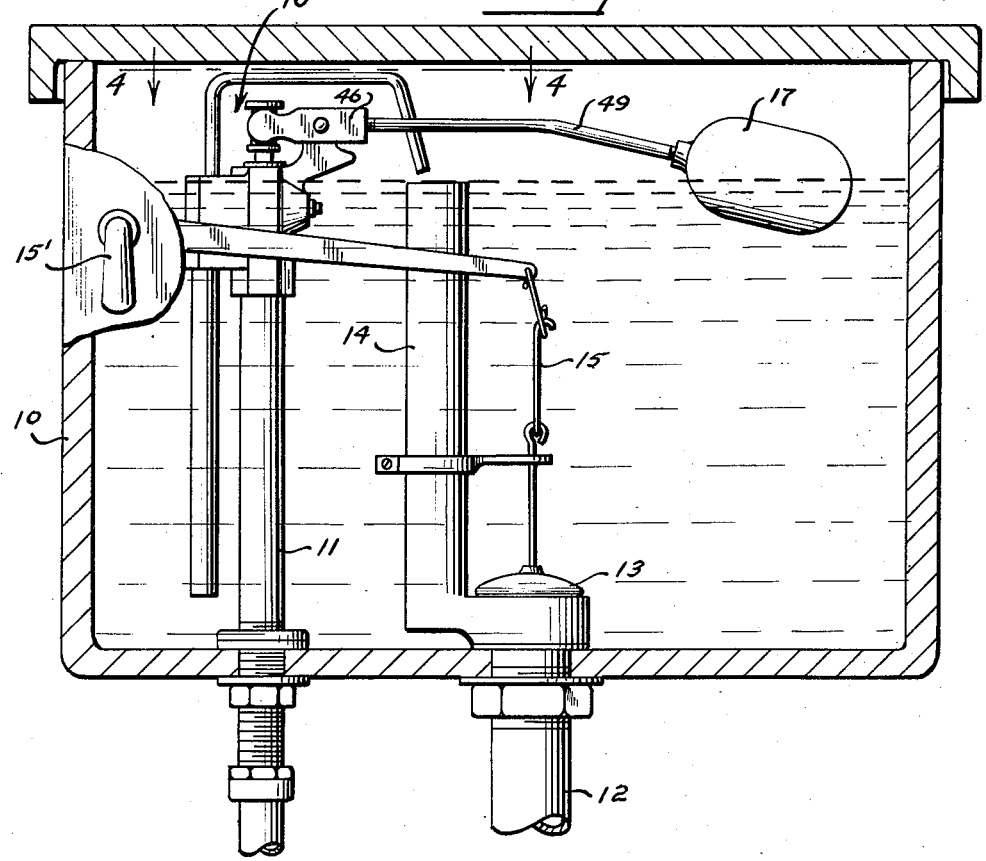
Fig-1-
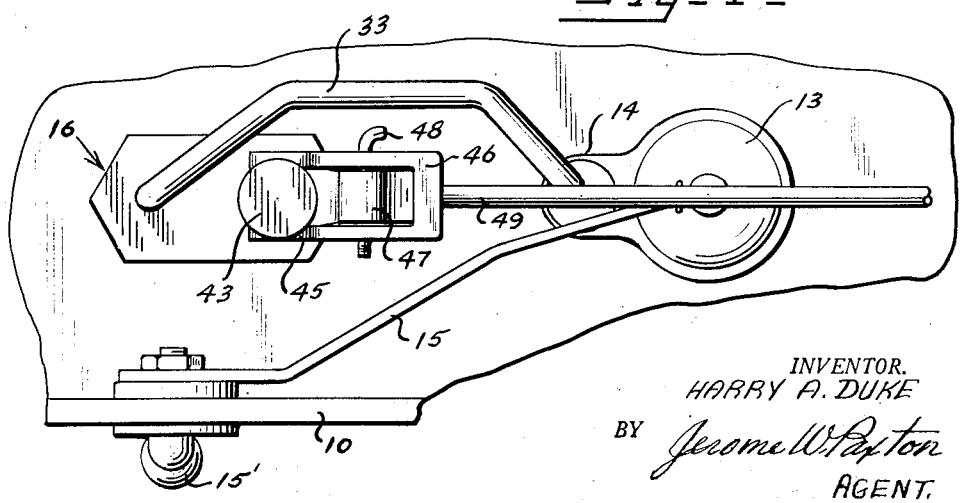
Fig-4-
INVENTOR.
HARRY A. DUKE
BY Jerome W. Paxton
AGENT.

Jan. 2, 1951 — H. A. DUKE — 2,536,921
VALVE ASSEMBLY
Filed Aug. 27, 1948 — 2 Sheets-Sheet 2

INVENTOR.
HARRY A. DUKE
BY Jerome W. Paxton
AGENT.

Patented Jan. 2, 1951

2,536,921

UNITED STATES PATENT OFFICE 2,536,921

VALVE ASSEMBLY

Harry A. Duke, Waterloo, Iowa

Application August 27, 1948, Serial No. 46,440

2 Claims. (Cl. 251—76)

The present invention relates to a valve assembly for controlling the flow of liquid, and more particularly has reference to a telescoping valve assembly for controlling the water supply to a flushing tank, the valve being of the type generally referred to as a "ball cock" in the trade. While I have shown and described the inventive concept used in conjunction with a flushing tank, it is thought obvious that the principles thereof may be employed with equally good results for controlling the flow of water and other liquids in faucets and other devices with a minor modification of the valve unit.

The majority of ball cocks currently employed in flush tanks requires a metal seat for the valve member and the seat becomes worn or defective, thereby requiring a new ball cock.

This invention provides a telescoping valve assembly which will overcome the necessity of having a seat which will become worn through use and which is simple in structural detail, positive and efficient in operation and capable of being readily and inexpensively manufactured.

Broadly, the invention comprises a valve body which is removably supported by the water supply pipe and provided with a vertical bore in axial alinement with the supply pipe. The bore is formed to provide a removable flexible seat and a flexible guide spaced from the seat, through which projects for telescoping movement a valve rod having suitably disposed openings adjacent its lower end, which openings are adapted to be disposed without the valve seat to prevent the admission of water into the tank yet be moved to a point intermediate the seat and the guide when water is to be admitted into the tank. The vertical movement of the valve rod is controlled by the float member generally associated with assemblies of this nature.

The valve body is so formed that access may be readily had to the seat and guide from the upper portion of the body and in the event it becomes necessary to replace either the guide or seat, this may be accomplished in a minimum of time and at a minimum cost.

When the tank is refilled or the valve is open, the high pressure of the water supply will be on both sides of the valve, thereby providing little, if any, friction on the valve seat and hence eliminates water hammer and vibration.

A cardinal object of the present invention is to provide a valve assembly of the character described wherein the valve stem is mounted for vertical movement with respect to a flexible seat and guide for controlling the flow of water.

Another object of the present invention is to provide a valve assembly of the type hereinabove set forth, wherein the component elements of the valve may be readily inserted in or removed from the valve body from the top portion of the body.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation, partly in section, of a flush tank equipped with my valve assembly.

Figure 4 is a view taken along the line 4—4 of Figure 1, looking in the direction of the arrows.

Figures 2, 3:
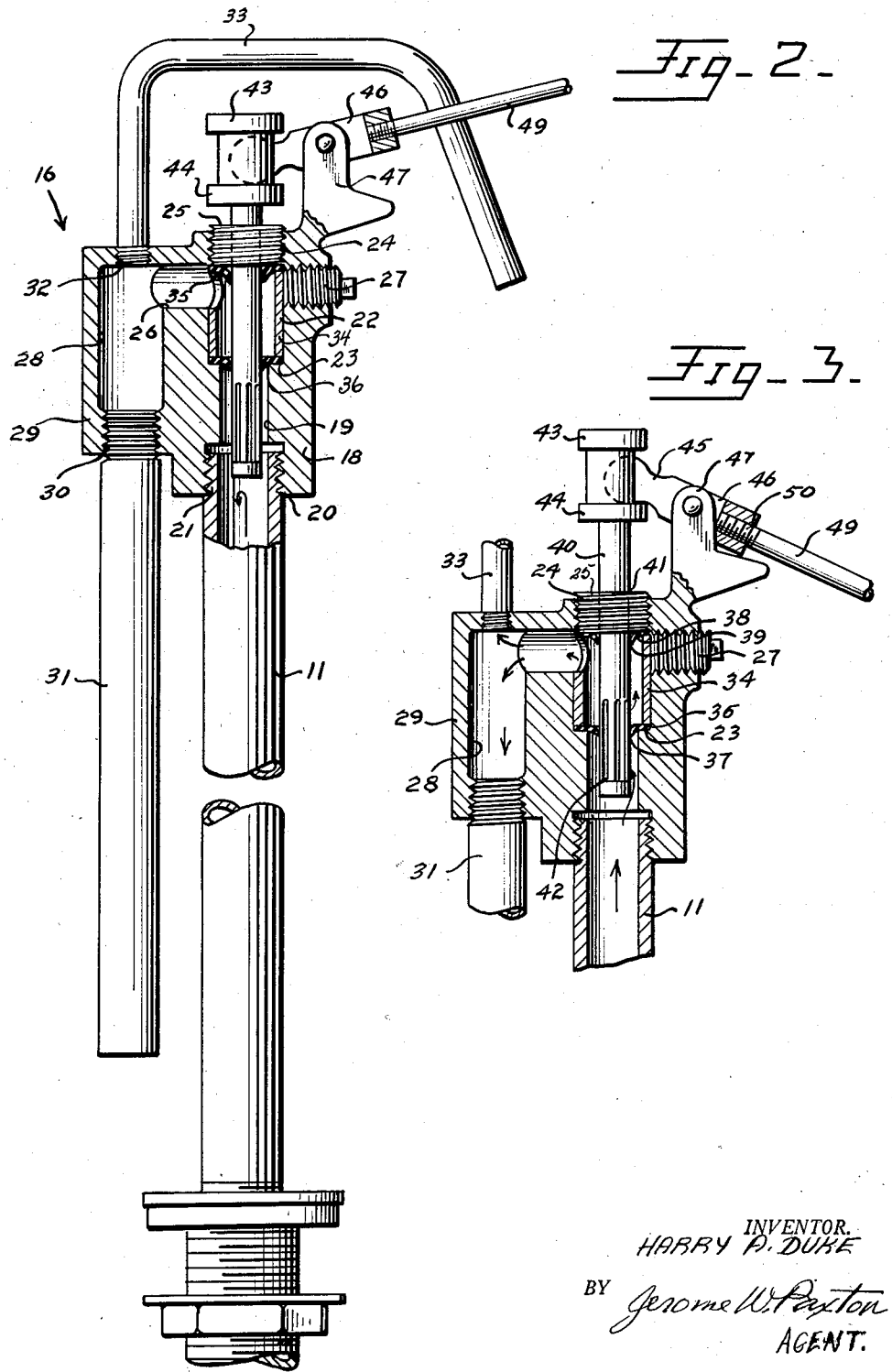
Figure 2 is a view in side elevation, partly in section, showing the component parts of the valve assembly, the valve being in the closed position.
Figure 3 is a vertical sectional view of the valve body illustrating the relation of the parts when the valve is open.

In Figure 1 there is illustrated a flush tank 10 of conventional design having suitably mounted therein a water supply pipe 11, an outlet pipe 12, valve means 13 for closing the outlet pipe 12, and an overflow stand pipe 14 which is in communication with the outlet pipe 12. The valve 13 is controlled by a linkage assembly 15 operated by a handle 15' located exteriorly of the tank 10. My novel valve assembly indicated generally 16 is supported by the upper end of the supply pipe 11 and is actuated by a float 17 of the usual construction.

As best shown in Figure 2, the valve 16 comprises a body 18 preferably of brass formed with a vertically disposed bore 19 extending therethrough. The lower end of the bore 19 is internally threaded, as at 20, to receive external threads 21 formed around the upper end of the supply pipe 11. The bore 19 is enlarged at its upper portion, as shown at 22, thereby providing an annular lower seat 23 while the upper end is threaded as indicated at 24 to receive a correspondingly threaded closure plug 25. The body 18 adjacent the upper end thereof is formed with a lateral passage 26, one end of which is in communication with the atmosphere and adapted to be closed by a threaded plug 27. The opposite end of the passage 26 empties into a vertical passageway 28 formed in an extension 29 integrally formed with the body 18. The lower end of the passageway 28 is threaded, as shown at 30, to receive the upper threaded end of a hush tube 31. The upper end of the passageway 28 is also threaded for receiving a threaded end 32 of a refill pipe 33.

A sleeve 34 having opposed ports 35 is of such diameter as to fit snugly within the enlarged area 22 of the bore 19 and a leather seat 36 having a centrally located aperture 37 is adapted to rest on the seat 23 and be secured thereto by the lower end of the sleeve 34. A leather seal or guide 38 formed with an aperture 39 is disposed between the upper end of the sleeve 34 and the lower end of the plug 25 and the apertures 37 and 39 are in vertical alinement.

A valve rod or stem 40 extends through an opening 41 in the plug 25 and through the alined apertures 39 and 37 in the seal 38 and the seat 36, respectively. A plurality of milled elongated slots 42 are provided in the valve rod and these slots terminate a short distance above the lower end of the valve rod. As perhaps best illustrated in Figure 2, the valve stem 40 is of such length that the upper ends of the slots are disposed below the leather seat 36 when the tank 10 contains the desired volume of water, and hence, water cannot be admitted through the valve 16.

The upper end of the valve stem 40 is provided with upper and lower spaced collars 43 and 44 for receiving therebetween arms 45 of a fitting 46. The fitting 46 is pivoted to a lug 47 formed on the top of the body 18 by a screw element 48 which extends through alined openings in the arms 45 and the lug 47, respectively. A connecting rod 49 is detachably secured to the fitting 46, as shown at 50, and the opposite end of the rod 49 is attached to the float 17 in any convenient manner. It can be seen, therefore, that by proper manipulation of the screw element 48 the fitting 46 may be readily disconnected from the valve rod 40.

While I believe that the operation of my invention can be readily understood from the above description, it may briefly be summarized as follows. Assuming the tank has been emptied, the float 17 will move downwardly until its pivotal movement is stopped by the rearward extension on the lug 47, as shown in Figure 3, and the valve stem 40 will be moved upwardly by the arms 45. This upward movement of the valve stem will cause the milled slots 42 to enter the enlarged area 22 of the valve body, thus providing means for the admission of the water supply into that area. The water will, of course, flow through the port 35 into the lateral passage 26 into the passageway 28 of the extension 29 of the valve body. Since the high pressure of the water will be on both sides of the seat 36, it can be seen that there will be no friction on the seat and water hammer and vibration will be eliminated. As the water level in the tank 10 rises, it is clear that the admission of water into the passageway will be gradually diminished and finally fully arrested as soon as the slots 42 reach a position below the leather seat 36.

It will be fully appreciated that the valve assembly hereinabove described is not complex and includes few, essential working parts. In the event replacement of either the seat 36, guide 38 or sleeve 34 is necessary, the fitting 46 is removed from the lug 47 and the valve stem 40 may then be easily withdrawn from the plug 25. The plug 25 is then removed from the valve body, thus allowing the workman to easily and quickly remove the guide, seat and sleeve. Under actual operating conditions, it has been demonstrated that the only portions of the valve assembly which are usually subject to wear and hence require replacement are the seat and guide. Each of these units is quite inexpensive and by virtue of the material of which the respective elements is made, they will last indefinitely.

After the necessary repair has been made, the plug 25 is then secured in place, the valve rod 40 again inserted through the alined openings in the plug, guide and seat, after which the fitting is again connected with the upper end of the valve stem.

I claim:

1. A valve unit comprising a body formed with a discharge passage, a supply passage, and a transverse passage extending through the walls of said discharge and supply passages to establish communication between them, the material about one end of said supply passage being counterbored and internally screw-threaded to receive and engage the externally screw-threaded end of a liquid supply pipe and the material about the opposite end of said supply passage being counterbored to form a long receiving chamber of greater diameter than said supply passage with the inner end wall of said chamber in the form of an annular shoulder constituting a seat for a flexible closure, and with the outer end portion of the wall of said chamber being internally screw-threaded, in combination with a removable sleeve making a snug fit in said chamber and formed with an opening registering with said transverse passage, a centrally bored externally screw-threaded removable retainer plug screwed into the outer end portion of said chamber, a centrally apertured removable flexible closure clamped between said seat and the inner end of said sleeve, a centrally apertured removable flexible seal guide clamped between the outer end of said sleeve and the inner face of said plug, the apertures in said closure and seal guide being of such size as to make a snug clinging sliding fit with the valve stem, and a reciprocable valve stem extending from the outer face of said plug through the same and said seal guide and closure into said supply passage and having some of the material of that part of its inner end portion which lies in said passage beyond said closure in the closed position of the valve unit omitted at spaced points about its periphery to constitute channels for the flow of liquid from said supply passage to and through said chamber when said valve stem is reciprocated to open position wherein said channels lie in both said supply passage and said chamber, and detachable means for reciprocating said valve stem.

2. A valve unit comprising a body formed with a discharge passage, a supply passage, and a transverse passage extending through the walls of said discharge and supply passages, one end of said supply passage being counterbored and internally screw-threaded to receive and engage the externally screw-threaded end of a liquid supply pipe and the opposite end of said supply passage being counterbored to form a long receiving chamber of greater diameter than said supply passage with the inner end wall of said chamber constituting a seat for a flexible closure, and with the outer end portion of the wall of said chamber being internally screw-threaded, in combination with a sleeve making a snug fit in said chamber and formed with an opening registering with said transverse passage, a centrally bored externally screw-threaded removable retainer plug screwed into the outer end portion of said chamber, a centrally apertured flexible closure clamped between said seat and the inner end of said sleeve, a centrally apertured flexible seal guide clamped between the outer end of said sleeve and the inner face of said plug, the apertures in said closure and seal guide being of such size as to make a snug clinging sliding fit with the valve stem, and a reciprocable valve stem extending from the outer face of said plug through the same and said seal guide and closure into said supply passage and having that part of its inner end portion which lies in said passage beyond said closure in the closed position of the valve unit slotted to constitute channels for the flow of liquid from said supply passage to and through said chamber when said valve stem is reciprocated to open position.

HARRY A. DUKE.

REFERENCES CITED

The following references are of record in the file of this patent:

UNITED STATES PATENTS

| Number | Name | Date |
|---|---|---|
| 430,689 | Rigg | June 24, 1890 |
| 756,880 | McIntire | Apr. 12, 1904 |
| 905,181 | Hedges | Dec. 1, 1908 |
| 1,028,497 | Mason | June 4, 1912 |
| 1,435,083 | Saylor | Nov. 7, 1922 |
| 1,567,198 | Sherwood | Dec. 29, 1925 |
| 1,606,274 | Utley | Nov. 9, 1926 |
| 1,957,567 | Williams | May 8, 1934 |
| 2,434,262 | Delany | Jan. 13, 1948 |

FOREIGN PATENTS

| Number | Country | Date |
|---|---|---|
| 166,619 | Great Britain | July 4, 1921 |